No. 792,089. PATENTED JUNE 13, 1905.
G. TOWERS.
FRUIT SCISSORS.
APPLICATION FILED SEPT. 16, 1903.
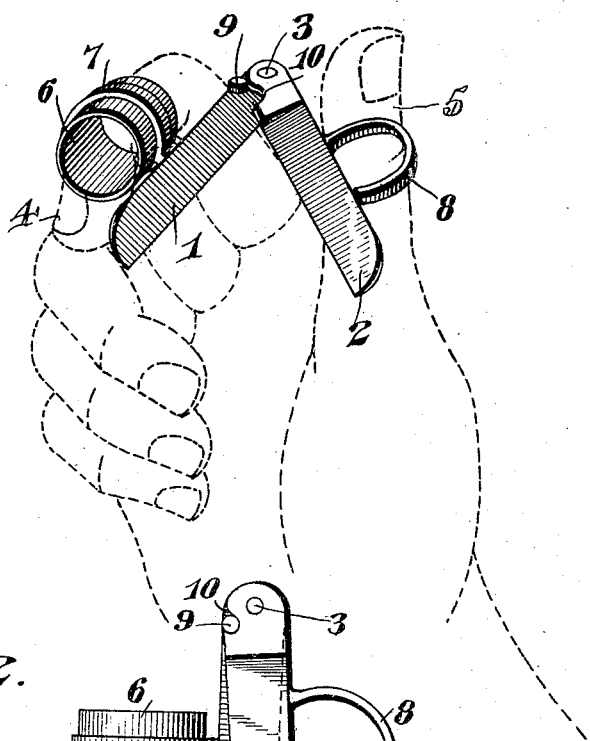
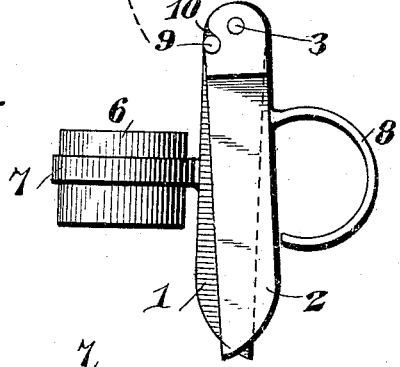
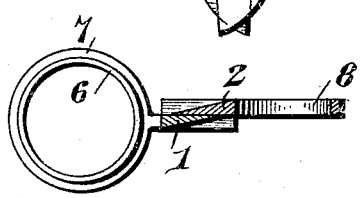
George Towers, Inventor
Witnesses No. 792,089. Patented June 13, 1905.

UNITED STATES PATENT OFFICE.

GEORGE TOWERS, OF CANON CITY, COLORADO.

FRUIT-SCISSORS.

SPECIFICATION forming part of Letters Patent No. 792,089, dated June 13, 1905.

Application filed September 16, 1903. Serial No. 173,492.

*To all whom it may concern:*

Be it known that I, GEORGE TOWERS, a citizen of the United States, residing at Canon City, in the county of Fremont and State of Colorado, have invented a new and useful Fruit-Scissors, of which the following is a specification.

The invention relates to improvements in fruit scissors or clippers.

The object of the present invention is to improve the construction of fruit scissors or clippers and to provide a simple, inexpensive, and efficient device of this character for cutting fruits which must be picked with the stem in order to prevent injury to the gathered fruit.

A further object of the invention is to provide a pair of fruit scissors or clippers adapted to be connected with the thumb and forefinger of the hand and capable of permitting the thumb to be arranged crosswise or at right angles to the forefinger in its natural position, whereby the greatest force may be brought to bear in operating the device.

Another object of the invention is to enable a pair of fruit scissors or cutters to be operated with greater convenience and less fatigue than heretofore and to prevent the hand from becoming cramped and to enable the fruit to be readily grasped while severing the stem.

With these and other objects in view the invention consists in the construction and novel combination and arrangement of parts hereinafter fully described, illustrated in the accompanying drawings, and pointed out in the claim hereto appended, it being understood that various changes in the form, proportion, size, and minor details of construction within the scope of the claim may be resorted to without departing from the spirit or sacrificing any of the advantages of the invention.

In the drawings, Figure 1 is a perspective view of a pair of fruit-scissors constructed in accordance with this invention and shown applied to a hand. Fig. 2 is a plan view of the same. Fig. 3 is a transverse sectional view.

Like numerals of reference designate corresponding parts in all the figures of the drawings.

1 and 2 designate a pair of blades pivoted together at one end by a rivet 3 or other suitable fastening device and provided with inner cutting edges and adapted to be oscillated and operated, as hereinafter explained, by the forefinger and thumb for severing the stems of fruit and for cutting flowers and the like. The blade 1 is provided at its outer edge or back with means for connecting it to the forefinger 4, which extends longitudinally of the blade 1, and the blade 2 is provided at its back with means for receiving the thumb 5, which is arranged at right angles to or crosswise of the blade 2 and the forefinger in its natural position, thereby enabling the device to be operated with the least fatigue and at the same time permitting the thumb to exert its full power on the device. By arranging the thumb and forefinger in this manner in their natural position it will be apparent that a much greater force can be applied in operating the device than is possible when the thumb is arranged approximately parallel with the forefinger.

The means for connecting the forefinger with the blade 1 consists of a tube or sleeve 6, having its opening parallel with the blade and arranged within a ring or band 7, which is disposed at right angles to the blade 1, as clearly shown in Fig. 3; but the tube may be secured to the blade in any other desired manner. The tube may be brazed, soldered, or otherwise secured within the ring or band when the latter is employed, and the ring or band may be connected with the back of the blade 1 in any desired manner.

The means for connecting the thumb with the blade 2 consists of a loop or piece 8, forming an opening and arranged in the same plane as the blade, the opening being disposed in a direction at right angles to the plane of the blade to permit the thumb to extend through it and to be arranged as before explained. The loop or piece 8, which is curved, is suitably secured to the blade, and it forms a segmental opening conforming approximately to the configuration of the thumb. The forefinger and the thumb are adapted to be readily inserted in the tube or sleeve and the loop 8, and the device is operated by moving the thumb and forefinger toward and from each other. This will enable the blades to be quickly opened and closed, and the device is adapted to be rapidly operated.

The inward movement of the blades is limited by means of a stop 9, consisting of a stud or projection mounted on the blade 1 and arranged to be engaged by the blade 2, which is provided with a notch or recess 10. The stud or projection 9 consists of a pin arranged in a perforation of the blade 1 and projecting from the same and located adjacent to the pivot 3. The notch or recess 10 forms a shoulder and enables the blades to close to the desired extent.

It will be observed that by reason of the position which the thumb occupies with relation to the remaining fingers of the hand when in the act of clipping the fruit the hand is in a proper position for grasping the fruit after it has been clipped from the stem.

It will be seen that the device is exceedingly simple and inexpensive in construction, that it possesses great strength and durability, and that it is adapted when operated by the thumb and forefinger to permit the thumb to be arranged crosswise of or at right angles to the forefinger in its natural position, whereby the device may be operated with greater facility and with the full power of the hand.

Having thus fully described my invention, what I claim as new, and desire to secure by Letters Patent, is—

A device of the class described, comprising two blades pivoted together at one end, a sleeve connected at one side with one of the blades at a point between the ends of said blade and extending longitudinally along said blade to permit the forefinger to lie against the back of said blade, and a loop or ring for the thumb mounted on the other blade at a point between the ends of said blade and diametrically opposite the sleeve, said loop or ring having its opening arranged at right angles to the opening of the sleeve, whereby the thumb crosses the blade and bears directly transversely against the back thereof giving increased power and positioning the hand to hold the fruit to be clipped.

In testimony that I claim the foregoing as my own I have hereto affixed my signature in the presence of two witnesses.

GEORGE TOWERS.

Witnesses:
G. R. CASSEDY,
L. D. ELLIOTT.